(12) United States Patent
Shaw et al.

(10) Patent No.: US 10,819,801 B2
(45) Date of Patent: Oct. 27, 2020

(54) SYSTEM AND METHOD FOR MANAGING COMMUNICATION SESSIONS BETWEEN CLIENTS AND A SERVER

(71) Applicant: TECTONIC INTERACTIVE LIMITED, Greater London (GB)

(72) Inventors: Andy Shaw, Greater London (GB); Wojciech Nowak, Greater London (GB)

(73) Assignee: TECTONIC INTERACTIVE LIMITED, Greater London (GB)

( * ) Notice: Subject to any disclaimer, the term of this patent is extended or adjusted under 35 U.S.C. 154(b) by 188 days.

(21) Appl. No.: 16/073,524

(22) PCT Filed: Jan. 27, 2017

(86) PCT No.: PCT/GB2017/050215
§ 371 (c)(1),
(2) Date: Jul. 27, 2018

(87) PCT Pub. No.: WO2017/129992
PCT Pub. Date: Aug. 3, 2017

(65) Prior Publication Data
US 2019/0045014 A1    Feb. 7, 2019

(30) Foreign Application Priority Data
Jan. 29, 2016   (GB) .................... 1601718.8

(51) Int. Cl.
*G06F 15/16*   (2006.01)
*H04L 29/08*   (2006.01)
(Continued)

(52) U.S. Cl.
CPC ........ *H04L 67/141* (2013.01); *H04L 43/0811* (2013.01); *H04L 61/1511* (2013.01);
(Continued)

(58) Field of Classification Search
USPC ..... 715/14.41; 709/203, 220, 224, 227, 206, 709/217, 218, 219, 223, 226, 228, 230,
(Continued)

(56) References Cited

U.S. PATENT DOCUMENTS 6,578,078 B1 * 6/2003 Smith .................. G06F 16/958
709/224
7,228,359 B1   6/2007 Monteiro
(Continued)

FOREIGN PATENT DOCUMENTS

EP        0817444 A2    1/1998
EP        1860519 A2    11/2007
(Continued)

*Primary Examiner* — Quang N Nguyen
(74) *Attorney, Agent, or Firm* — Lando & Anastasi, LLP

(57) ABSTRACT

A Domain Name System (DNS) name server configured to manage access by client devices to a web server configured to provide access to a target resource, optionally a web application, to client devices over the Internet in a short term data communication session, the DNS name server comprising: a domain name resolver; and a web server session manager; the domain name resolver being configured, in response to receipt from a client device of a DNS query including a domain name generated by a client, the domain name domain name comprising a domain name associated with the address of the web server and a prefix label corresponding to a session identifier (ID) for identifying the client, to: resolve the Internet Protocol (IP) address of the domain name; and pass the session ID for the client to the web server session manager; the session manager being configured, in response to receipt of the session ID from the domain name resolver, to: monitor a status of the web server; apply session management logic to the session ID, the session management logic being configured to determine whether or not to forward the client device to the web server based on one or more of: a monitored capacity of the web (Continued)

server, and information about the client device obtainable from the session ID; and if the logic determines that capacity is available in the web server for the client, cause the DNS name server to send to the client device a DNS reply containing the address of the web server configured to provide the client with access to the target resource.

17 Claims, 2 Drawing Sheets

(51) Int. Cl.
  *H04L 29/12* (2006.01)
  *H04L 12/26* (2006.01)
(52) U.S. Cl.
  CPC .......... *H04L 61/1552* (2013.01); *H04L 67/02* (2013.01); *H04L 67/1023* (2013.01); *H04L 67/1029* (2013.01)
(58) Field of Classification Search
  USPC ........ 709/238; 713/150, 156, 171; 726/3, 11
  See application file for complete search history.

(56) References Cited

U.S. PATENT DOCUMENTS

| | | | | |
|---|---|---|---|---|
| 8,484,353 | B1* | 7/2013 | Johnson | H04L 47/70 709/226 |
| 2005/0204045 | A1* | 9/2005 | Belkin | G06F 9/5027 709/203 |
| 2005/0273692 | A1* | 12/2005 | Horvitz | G06F 21/335 715/270 |
| 2006/0253420 | A1* | 11/2006 | Hinton | G06F 21/62 |
| 2006/0277596 | A1* | 12/2006 | Calvert | H04L 63/0218 726/3 |
| 2007/0180230 | A1* | 8/2007 | Cortez | H04L 9/302 713/156 |
| 2008/0281696 | A1* | 11/2008 | Whitehead | G06Q 30/02 705/14.41 |
| 2008/0282336 | A1* | 11/2008 | Diaz Cuellar | H04L 63/0263 726/11 |
| 2008/0320003 | A1 | 12/2008 | Heinson et al. | |
| 2009/0043900 | A1 | 2/2009 | Barber | |
| 2011/0078278 | A1* | 3/2011 | Cui | H04L 29/12613 709/217 |
| 2011/0145437 | A1* | 6/2011 | Niven-Jenkins | H04L 29/12783 709/238 |
| 2012/0166598 | A1* | 6/2012 | Yuan | H04L 41/12 709/224 |
| 2015/0067819 | A1* | 3/2015 | Shribman | H04L 67/06 709/218 |
| 2015/0113279 | A1* | 4/2015 | Andersen | H04L 63/0457 713/171 |
| 2015/0256508 | A1 | 9/2015 | Townsend et al. | |
| 2016/0277596 | A1* | 9/2016 | Masuda | H04N 1/0023 |
| 2020/0220746 | A1* | 7/2020 | Shribman | H04L 61/609 |

FOREIGN PATENT DOCUMENTS

| | | |
|---|---|---|
| EP | 2706731 A2 | 3/2014 |
| WO | 2012/092765 A1 | 7/2012 |

* cited by examiner

SYSTEM AND METHOD FOR MANAGING COMMUNICATION SESSIONS BETWEEN CLIENTS AND A SERVER

CROSS-REFERENCE TO RELATED APPLICATIONS

This application is a U.S. National Phase Application under 35 U.S.C. § 371 of International Application No. PCT/GB2017/050215 filed Jan. 27, 2017, which claims priority to Great Britain Application No. 1601718.8 filed Jan. 29, 2016.

FIELD OF THE DISCLOSURE

This disclosure relates to a system and method for managing communication sessions between clients and a server session. In particular, the application relates to a managing the establishment of requested new sessions between a large number of clients and a server over a short timescale.

BACKGROUND

The Internet provides a resilient communication infrastructure to enable one or more server computers to provide access to resources operated by or accessible to the server to electronic client devices operating under application control. Typically, a user of an electronic device such as a personal computer, laptop, smart phone or tablet device will send a request over a wired or wireless Internet connection towards a server in the form of a Hypertext transfer protocol (HTTP) request for provision of the resources over an HTTP logical connection. The interaction with the server may be initiated directly by the user entering a Uniform Resource Identifier (URI) into a web browser which then locates the Internet Protocol (IP) address of the resource and constructs and sends the HTTP request over the Internet towards the server address. On the other hand, the interaction with the server may be initiated indirectly through the user initiating or interacting with application software installed on the electronic device which, in response to user control thereof through a user interface, constructs and sends the HTTP request over the Internet towards the server address. The client device may also interact with different servers to service an HTTP request, by the server contacting other servers or networks to provide, e.g. database server access, web services or content delivery networks, or the server may bounce the client connection to other servers optionally having different IP addresses.

On receipt of the HTTP request, the server constructs an appropriate HTTP response. If the request is successful, a response is crafted that provides the electronic client device access to the resource. For example, the server may be a web server that includes an HTML page stored thereat in its reply. However, web servers are able to provide access to resources in much more sophisticated ways than static HTML pages. For example, server side scripting may be used to construct and serve to client devices dynamic HTML pages. To enable more sophisticated data interactions between a client and the resource on the Internet accessible through the server, a communication session may be established between the client and the server, typically identifiable by a session ID, to enable stateful and extended communications between the client and server through multiple HTTP requests and responses. In this way, sophisticated program logic can be implemented at the server side (and at the client side, e.g. in the browser) to enable a rich client interaction with the server-side resource through the client device, in the form of a web application provided in a browser or accessible through a client side application such as a mobile "app" installed on a portable electronic device or a thin client executable operating on a personal computer. These client-server software applications operating over extended HTTP sessions require of the server could computational resources and memory. Therefore, session management processes run in web servers to allocate and manage the server's finite resources to handle each client session.

The rich interaction that can be offered by web applications operated by web servers to multiple client devices over the Internet has enabled a wide number of use cases for various enterprise, entertainment and social purposes. A number of such use cases lead to an extremely large number of client sessions request for access to a resource being received by a server over a very short period of time. One such example is in the broadcast television and entertainment industry in which viewers of a live entertainment show are offered an enriched experience with the show by also interacting with a specifically designed web application that provides access to resources on the Internet that are related to the show in a "second screen experience". For example, tens of millions of viewers of live talent shows on television are encouraged to interact with the show and vote for their favourite contestants and they may do so over the Internet using a browser-hosted web application or by operating a dedicated client side application that is provisioned by a server. For example, a web application may provide the users with content related to the show delivered by a content delivery network and also a facility to post messages related to the show visible by other viewers. Crucially, viewers wanting to vote for contestants on the show through the second screen application need to be up to do so in a reliable and trustworthy manner.

However, IT managers tasked with ensuring the operation of web servers to provision client sessions for second screen web applications face significant challenges to their ability to reliably and practically serve demand for the resource. This is due to the sudden increase and decrease in demand for client sessions arising, in the example above, due to the "real-time" nature of "in-app" voting on second screen apps for live television entertainment broadcasts that generally last a short period of time (usually an hour or less). This means that, the IT manager tasked with providing viewers of the live television broadcast with a high-quality second screen experience are required to periodically provide server resources sufficient to serve tens of millions of client sessions over a very short period of time, whereas at other times, demand for session provision can be very low, or even zero.

As the rate of change of demand for session provision can be extremely quick (from zero to tens of millions and back in the space of minutes), the IT managers tasked with arranging for the flexible provisioning of server capacity to meet this demand. At times of zero demand, the running a large server farm to service this many client sessions is not economically viable. Similarly, operating a server infrastructure that is less costly but undercapacity can cause client users to become frustrated with a poor client experience as HTTP requests go unanswered, web application functionality is compromised, and the server may even be prevented from serving any client sessions due to a complete overload.

A scalable server infrastructure solution is offered these days through virtualised a cloud server available cloud computing providers such as RackSpace or Amazon Web Services. In the cloud computing paradigms, IT managers may "rent" server capacity to host web applications for provisioning to client devices. These cloud servers may be provided in addition to dedicated servers. However, generally the provisioning of additional servers through such cloud-based services is not readily scalable to the level required for the above purposes on the required timescales as short as minutes. For instance, it may take an IT manager half an hour or more to arrange for the provision of significant additional cloud server capacity. Certain cloud services providers provide auto-scaling functionality that causes the volume of cloud server provisioning to automatically scale in response to an increase in numbers of received HTTP requests. However, the sensitivity of these autoscaling functions is also generally not fast enough to sense and then respond to a rapid increase in demand. In any case, with scalable client/server solutions, IT managers are required to monitor and plan for demand and ensure the adaptation of web server provisioning is sufficient to satisfy the number of client session requests. This can be complicated to arrange, and prone to failure and error. For "in-app" voting applications for live broadcast television, regulators often require that votes must be cast in an countable, auditable and reliable way in which voters have confidence that their votes will can be cast, and that cast votes will be counted. Generally, a system for which there is any risk of server overload, or of waiting users going unprovisioned, will not meet the regulatory requirements and will not be suitable for provisioning such live "in-app" voting functionality. In addition, arranging for the provision of server capacity to reliably serve tens of millions of client sessions simultaneously, even for relatively short periods, can be extremely costly.

It is in the above context that the present disclosure has been devised.

BRIEF SUMMARY OF THE DISCLOSURE

Viewed from one aspect, the present disclosure provides a Domain Name System (DNS) name server configured to manage access by client devices to a web server configured to provide access to a target resource, optionally a web application, to client devices over the Internet in a short term data communication session, the DNS name server comprising: a domain name resolver; and a web server session manager; the domain name resolver being configured, in response to receipt from a client device of a DNS query including a domain name generated by a client, the domain name comprising a domain name associated with the address of the web server and a prefix label corresponding to a session identifier (ID) for identifying the client, to: resolve the Internet Protocol (IP) address of the domain name; and pass the session ID for the client to the web server session manager; the session manager being configured, in response to receipt of the session ID from the domain name resolver, to: monitor a status of the web server; apply session management logic to the session ID, the session management logic being configured to determine whether or not to forward the client device to the web server based on one or more of: a monitored capacity of the web server, and information about the client device obtainable from the session ID; and if the logic determines that capacity is available in the web server for the client, cause the DNS name server to send to the client device a DNS reply containing the address of the web server configured to provide the client with access to the target resource.

In embodiments, the session manager may be further configured to: if the logic determines that capacity is not available in the web server for the client, cause the DNS name server to send to the client device a DNS reply containing an address of a web server configured to provide the client with access to a waiting room resource. In embodiments, the web server configured to provide the client with access to a waiting room resource may be configured such that it can serve client access to the waiting room resource with a relatively low per-client overhead compared to the web server configured to provide the client with access to the target resource.

In embodiments, the session manager is further configured to: extract information about the client device from the session ID, said information including one or more of: an identifier of the client device; an identifier of the user of the client device; a timestamp of the DNS request; an IP address of the client device; a MAC address of the client device.

In embodiments, the session management logic may be configured to extract information about the client device from the session ID by decoding said information encoded into the session ID.

In embodiments, the session management logic may be configured to decrypt an encrypted session ID.

In embodiments, the session ID may be unique or semi-unique.

In embodiments, for client devices forwarded to the web server configured to provide the client with access to a waiting room resource, one or more further said DNS queries may be received, optionally periodically, the DNS queries comprising the domain name associated with the address of the web server. In embodiments, the session ID of each said DNS query received from the same client is different.

In embodiments, as basis for determining whether or not to forward the client device to the web server, the session management logic is configured to: track client wait times for access to the target resource, based on time stamps and client IDs or User IDs of previously received DNS requests; and/or check a categorisation, optionally hierarchical or prioritised, of lists of client IDs or User IDs In embodiments, the domain name resolver is further configured to: extract from the DNS query the labels corresponding to the host name of the server; and extract from the DNS query the session ID arranged as a prefix label of the domain name.

In embodiments, the DNS name server may further comprise: one or more processors; and memory comprising instructions which when executed by one or more of the processors, cause the DNS name server to instantiate and operate the domain name resolver and/or the web server session manager as one or more logical modules.

Viewed from another aspect, the present disclosure provides a client device configured for use in conjunction with a DNS name server as disclosed herein, the client device comprising: session ID logic configured to generate a session ID for identifying the client usable as a prefix label to the hostname in a domain name query; and DNS query logic being configured to send towards a DNS name server a DNS query comprising a domain name associated with the address of the web server configured to provide access to a target resource and a prefix label corresponding to the session identifier (ID) for identifying the client.

In embodiments, the client device is further configured, if forwarded by the DNS name server to a web server configured to provide the client with access to a waiting room resource, to periodically operate said session ID logic and said DNS query logic to generate a different session ID and to send towards the DNS name server a further DNS query comprising a domain name associated with the address of the web server configured to provide access to a target resource and a prefix label corresponding to the different session identifier (ID) for identifying the client.

In embodiments, the session ID logic is further configured to generate the session ID based on one or more of: an identifier of the client device; an identifier of the user of the client device; a timestamp of the DNS request; an IP address of the client device; a MAC address of the client device.

Viewed from another aspect, the present disclosure provides a system for managing access by client devices to a web server configured to provide access to a target resource, optionally a web application, to client devices over the Internet in a short term data communication session, comprising: a DNS name server as disclosed herein; a web server configured to provide the client with access to the target resource; and a web server configured to provide the client with access to a waiting room resource; and optionally, a client device as disclosed herein.

In embodiments, the web server configured to provide the client with access to a waiting room resource may be configured such that it can serve client access to the waiting room resource with a relatively low per-client overhead compared to the web server configured to provide the client with access to the target resource.

Viewed from another aspect, the present disclosure provides computer readable medium, optionally non-transitory, carrying instructions which when executed by one or more processors of a DNS name server, cause the DNS name server to be configured as disclosed herein.

Viewed from another aspect, the present disclosure provides computer readable medium, optionally non-transitory, carrying instructions which when executed by one or more processors of a DNS name server, cause the client device to be configured as disclosed herein.

Viewed from another aspect, the present disclosure provides a method of operating a Domain Name System (DNS) name server for managing access by client devices to a web server configured to provide access to a target resource, optionally a web application, to client devices over the Internet in a short term data communication session, the method comprising: in response to receipt from a client device of a DNS query including a domain name generated by a client, the domain name comprising a domain name associated with the address of the web server and a prefix label corresponding to a session identifier (ID) for identifying the client: resolving the Internet Protocol (IP) address of the domain name; passing the session ID for the client to the web server session manager: monitoring a status of the web server; applying session management logic to the session ID, the session management logic being configured to determine whether or not to forward the client device to the web server based on one or more of: a monitored capacity of the web server, and information about the client device obtainable from the session ID; and if the logic determines that capacity is available in the web server for the client, causing the DNS name server to send to the client device a DNS reply containing the address of the web server configured to provide the client with access to the target resource.

The optional features described above in relation to embodiments of the DNS name server and client device of one aspect of the disclosure, are, where appropriate, also to be considered within the scope of the disclosure of the present application as being provided in embodiments of the above-described web servers method and computer readable medium of the other aspects of the disclosure, wherein the apparatus features of the embodiments are to be considered to be disclosed when adapted to implement their method of software equivalents.

BRIEF DESCRIPTION OF THE DRAWINGS

Certain embodiments of the present disclosure will now be described in more detail by way of example, and with reference to the accompanying drawings, in which.

DETAILED DESCRIPTION

Figure 1:
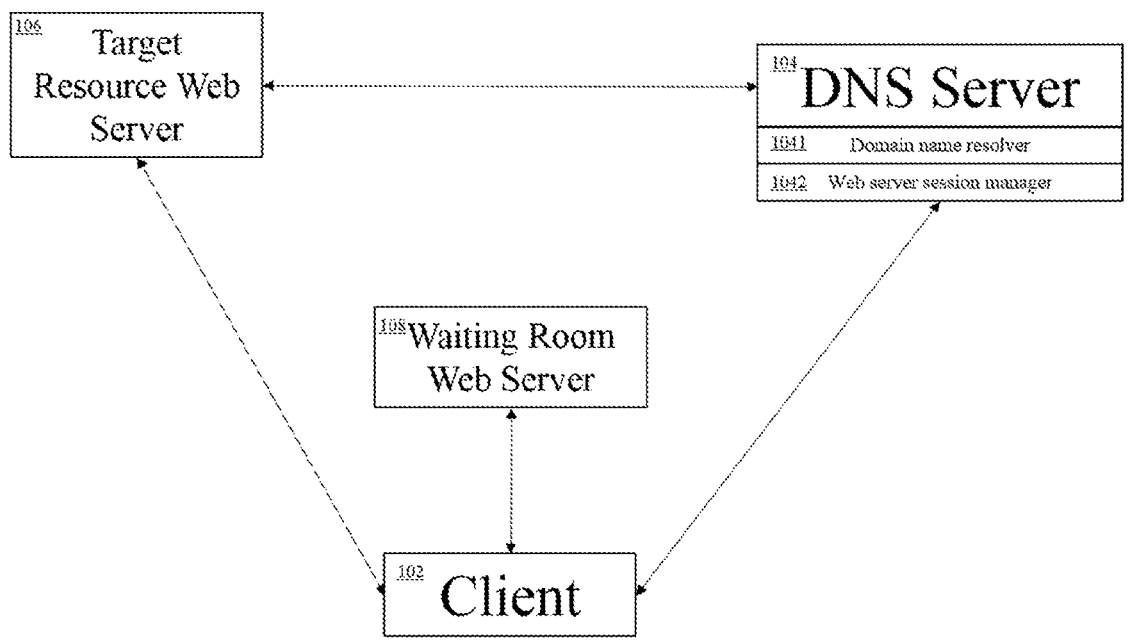
FIG. 1 is a schematic illustration of a system for managing, by operation of a Domain Name System (DNS) name server, access by client devices to a web server configured to provide access to a target resource, optionally a web application, to client devices over the Internet in a short term data communication session in accordance with embodiments of the present disclosure.

FIG. 1 illustrates a system containing a client 102, a domain name system (DNS) name server 104, and a target resource web server 106 and a waiting room web server 108. The name server 104 has two constituent parts, the domain name resolver 1041 and the webserver session manager 1042.

Web server 106 and room web server 108 may themselves comprise multiple servers each configured to service multiple client sessions, wherein the load on each server can be balanced using a round robin approach in the Domain Name System (DNS) name server.

As set out in the background section, devices on the internet communicate with each other on the network layer through IP addresses. In general terms, a DNS simplifies this by allowing devices to communicate by alpha numeric domain names which relate to IP addresses. When a device wishes to access a resource using a domain name, the device communicates with a DNS name server on a preconfigured IP address and requests the IP corresponding IP address for the server. The name sever contains a table of domains associated with IP addresses. Domain names are set out in a hierarchical structure, for example "bottom.medium.top" and hence name servers are arranged correspondingly. If a name server does not contain an IP address for an associated domain name, the name server will pass on the request to the appropriate name server in the hierarchy.

In the present disclosure, the DNS name server 100 is configured to both resolve domain name requests from clients 102 and manage sessions for target web server 106. The domain name resolver 1041 is configured to receive from a client device DNS queries. Upon reception of a request for access to target web server 106 it is recorded in the session manager 1041. The session manager 1042 applies session management logic to the request.

The client 102 generates a name server request, wherein part of the request—the session ID—is related to the specific client. For example, it may contain the MAC address of the client 102 and a time stamp. It will be appreciated that there are many other ways that a client device may be identified. For example, the name server request may be formatted as "clientidentifiercompany.com", furthermore the client identifier may be obfuscated using a hashing algorithm. The logic for producing this request may be embedded in a webpage, or it may be embedded in code of a specific program. It will also be appreciated that there are many other ways of implementing the logic required for formatting of the request.

The target web server 106 and waiting room web server 108 are configured to process requests for data, usually over a protocol such as HTTP. The demand for access of the web server 106 may exceed that of its capacity. In order to control access to the web server 106, the target web server 106 may indicate its available capacity to the web server session manager 1042 of the name server 104.

The web session manager 1042 may comprise logic which selects clients 102 to be resolved to waiting room server 108 and those to be resolved to the target resource server 106. For example this logic may implement a queuing system based on the time stamp, or it may prioritise certain users dependent on other data embedded in the client identifier.

When available capacity is further indicated to the name server 104 by the waiting room server 108, the name server 104 may forward clients 102 to the target resource web server 106 by responding to the DNS query with the IP address of the target resource web server 106. Where capacity is not available, the DNS requests from a client 102 may be resolved to a waiting room server 108 where they wait until the name server 104 resolves them to the target web server 106.

It will be appreciated that a client 102 may be any one of, a personal computer, a smart phone, tablet, or any other devices capable of communicating with the internet.

Figure 2:
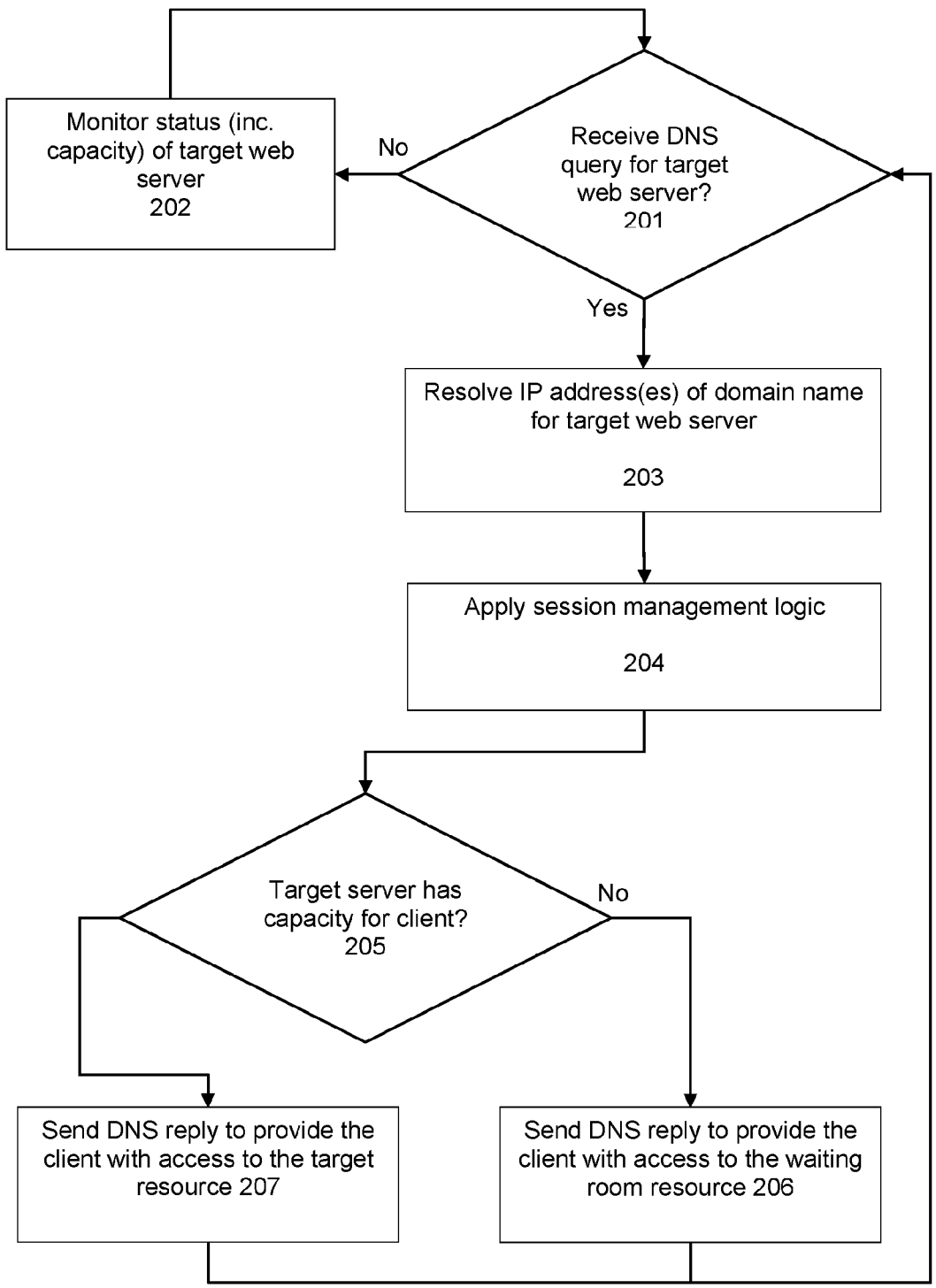
FIG. 2 is a process flow diagram illustrating a method of operating a Domain Name System (DNS) name server in accordance with embodiments of the present disclosure.

A method of operating a Domain Name System (DNS) name server in accordance with embodiments of the present disclosure will now be described in more detail with reference to FIG. 2.

In step 201, the DNS name server (104) checks to see if it has received from a client device (102) a DNS query including a domain name generated by the client device (e.g. clientidentifier.company.com). The domain name comprises a domain name associated with the address of the web server (in the example, company.com) and a prefix label corresponding to a session identifier (ID) for identifying the client (in the example, clientidentifier).

If not, the DNS name server (104) proceeds to step 202, in which it is configured to monitor the status of the target web server (106) (including its capacity to handle additional client-server sessions), and then loop back to step 101 to check for receipt of a DNS query. The DNS name server (104) may be configured to monitor the status of the target web server (106) less frequently.

Alternatively, if, in step 201, a DNS query is received, the DNS name server process continues to step 203 in which the Internet Protocol (IP) address(es) of the domain name are resolved. This may be achieved through normal domain name resolution, by which the DNS name server (104) receives the DNS resolution query for at least the hostname. As the URI if unique, or semi-unique, a DNS query is always sent by the client to a DNS server, which then recursively resolves the domain name, until it is forwarded, at the hostname level, to the DNS name server (104) providing the session management logic for the target web server. Here, the DNS name server (104) may resolve the IP address of the target web server (106) and/or the IP address of the waiting room web server (108). The DNS name server (104) also strips out the session ID.

In step 204, the DNS name server (104) applies session management logic (1042) to determine, based on the session ID, whether or not to forward the client device to the target web server (106) based on one or more of: a monitored capacity of the web server (from step 202), and information about the client device obtainable from the session ID. The information encoded in and extracted from the session ID may include one or more of: an identifier of the client device; an identifier of the user of the client device; a timestamp of the DNS request; an IP address of the client device; a MAC address of the client device. The coding scheme for the session ID implemented by the client device (102) corresponds to the decoding scheme implemented by the DNS name server (104). Encryption may be used for security purposes.

The session management logic (1042) may be configured to base its determination of whether or not to forward the client device to the web server on a number of rules based on the session ID information, user information and monitored status of the target web server (106). These rules could make a decision based on, for example, tracking of client wait times for access to the target resource, based on time stamps and client IDs or User IDs of previously received DNS requests; or checking of a categorisation, optionally hierarchical or prioritised, of lists of client IDs or User IDs.

Then, in step 205, if the session management logic (1042) decides to provide the client device (102) with access to the waiting room resource (e.g., the target web server is currently at capacity), the process then proceeds to step 206 in which the DNS name server (104) is caused to send to the client device (102) a DNS reply containing an IP address of the waiting room web server (108). Hereafter the process loops back to step 201 and waits to hear again from the client device (102), which is configured by logic from e.g. embedded code in an HTML page served by waiting room web server (108), to periodically generate a new session ID and retry requesting access to the target web server (106) by sending a new DNS request to DNS name server (104).

Alternatively, if the session management logic (1042) decides at step 205 to provide the client device (102) with access to the target resource (106) (e.g., the target web server is currently below capacity), the process then proceeds to step 207 in which the DNS name server (104) is caused to send to the client device (102) a DNS reply containing an IP address of the target web server (106).

In this way, the target web server (106) can service all requested sessions by the DNS server spreading out demand through session management using an intelligent extended DNS system. This approach to managing capacity is flexible (it can be easily implemented in native web browsers and apps without requiring any adaptation thereto) and very quick to operate with a low latency and service overhead (DNS is early in the network and uses UDP, which means the system requirements are low to handle millions of requests, and system stress is kept away from the target server). In this way, users of client devices have a good user experience, without any risk of the server falling over due to overcapacity, and have confidence that their interactions and voting will be validated and counted. In addition, web server providers can serve large numbers of sessions using relatively small server capacity. This also takes away the requirements to plan capacity and react immediately to sudden changes in demand. The intelligent aspect of the system also allows operators to easily provide an enriched and more sophisticated experience, for example by tracking users and devices, for example, to ensure that individual users do not have to wait too long, and 'premium' users can jump straight to the head of the queue.

Any of the methods in accordance with the present invention may be implemented at least partially using software e.g. computer programs. The present invention thus also extends to a computer program comprising computer readable instructions executable to perform, or to cause a navigation device to perform, a method according to any of the aspects or embodiments of the invention. Thus, the invention encompasses a computer program product that, when executed by one or more processors, cause the one or more processors to generate suitable images (or other graphical information) for display on a display screen. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Throughout the description and claims of this specification, the words "comprise" and "contain" and variations of them mean "including but not limited to", and they are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A Domain Name System (DNS) name server configured to manage access by client devices to a web server configured to provide access to a target resource to client devices over the Internet in a short term data communication session, the DNS name server comprising:
   a domain name resolver; and
   a web server session manager;
   the domain name resolver being configured, in response to receipt from a client device of a ON query including a domain name generated by the client device, the domain name comprising a domain name associated with the address of the web server and a prefix label corresponding to a session identifier (ID) for identifying the client, to:
      resolve the Internet Protocol (IP) address(es) of the domain name; and
      pass the session ID for the client to the web server session manager;
   the web server session manager being configured, in response to receipt of the session ID from the domain name resolver, to:
      monitor a status of the web server;
      apply session management logic to the session ID, the session management logic being configured to determine whether or not to forward the client device to the web server based on one or more of: a monitored capacity of the web server, and information about the client device obtainable from the session ID;
      if the logic determines that capacity is available in the web server for the client, cause the DNS name server to send to the client device a DNS reply containing the address of the web server configured to provide the client with access to the target resource; and
      if the logic determines that capacity is not available in the web server for the client, cause the DNS name server to send to the client device a DNS reply containing an address of a waiting room web server configured to provide the client with access to a waiting room resource where the client device can waft until the DNS name server provides the client device with access to the target resource, the waiting room web server to configure the client device to retry requesting access to the target resource;
   wherein the waiting room web server is configured such that it can serve client access to the waiting room resource with a low per-client overhead target resource.

2. A DNS name server as claimed in claim 1, wherein the session manager is further configured to:
   extract information about the client device from the session ID, said information including one or more of:
      an identifier of the client device;
      an identifier of the user of the client device;
      a timestamp of the DNS request;
      an IP address of the client device;
      a MAC address of the client device.

3. A DNS name server as claimed in claim 1, wherein the session management logic is configured to extract information about the client device from the session ID by decoding said information encoded into the session ID.

4. A DNS name server as claimed in claim 1, wherein the session management logic is configured to decrypt an encrypted session ID.

5. A DNS name server as claimed in claim 1, wherein the session ID is unique or semi-unique.

6. A DNS name server as claimed in claim 1, wherein, for client devices forwarded to the waiting room web server, one or more further said DNS queries are received, the DNS queries comprising the domain name associated with the address of the web server.

7. A DNS name server, as claimed in claim 6, wherein the session ID of each said DNS query received from the same client is different.

8. A DNS name server as claimed in claim 1, wherein, as basis for determining whether or not to forward the client device to the web server, the session management logic is configured to:
track client wait times for access to the target resource, based on time stamps and client IDs or User IDs of previously received DNS requests; and/or
check a categorisation of lists of client IDs or User IDs.

9. A DNS name server as claimed in claim 1, wherein the domain name resolver is further configured to:
extract from the DNS query the labels corresponding to the host name of the server; and
extract from the DNS query the session ID arranged as a prefix label of the domain name.

10. A DNS name server as claimed in claim 1, further comprising:
one or more processors; and
memory comprising instructions which when executed by one or more of the processors, cause the DNS name server to instantiate and operate the domain name resolver and/or the web server session manager as one or more logical modules.

11. A client device configured for use in conjunction with a DNS name server, the client device comprising:
session ID logic configured to generate a session ID for identifying the client usable as a prefix label to the hostname in a domain name query; and
DNS query logic being configured to send towards the DNS name server a DNS query comprising a domain name associated with the address of a web server configured to provide access to a target resource and a prefix label corresponding to the session identifier (ID) for identifying the client;
wherein the DNS name server is configured to determine whether or not to forward the client device to the web server based on one or more of: a capacity of the web server, and information about the client device obtained from the session ID;
wherein if the DNS name server determines that capacity is available in the web server for the client air, DNS name server sends to the client device a DNS reply containing the address of the web server configured to provide the client with access to the target resource;
wherein the client device, if the capacity of the web server is not available for the client then forwarded by the DNS name server to a waiting room web server configured to provide the client with access to a waiting room resource, is to be configured by the waiting room web server to retry requesting access to the target resource;
wherein the waiting room web server is configured such that it can serve client access to the waiting room resource with a low per-client overhead compared to the web server configured to provide the client with access to the target resource.

12. A client device as claimed in claim 11, being further configured, if forwarded by the DNS name server to the waiting room web server, to periodically operate said session ID logic and said DNS query logic to generate a different session ID and to send towards the DNS name server a further DNS query comprising a domain name associated with the address of the web server configured to provide access to a target resource and a prefix label corresponding to the different session identifier (ID) for identifying the client.

13. A client device as claimed in claim 11, wherein the session ID logic is further configured to generate the session ID based on one or more of:
an identifier of the client device;
an identifier of the user of the client device;
a timestamp of the DNS request;
an IP address of the client device; and
a MAC address of the client device.

14. A system for managing access by client devices to a web server configured to provide access to a target resource, to client devices over the Internet in a short term data communication session, comprising:
a DNS name server;
a web server configured to provide a client with access to the target resource;
a waiting room web server configured to provide the client with access to a waiting room resource; and
a client device;
wherein the DNS name server is configured to:
in response to receipt from the client device of a DNS query including a domain name generated by the client device, the domain name comprising a domain name associated with the address of the web server and a prefix label corresponding to a session identifier (ID) for identifying the client;
resolve the Internet Protocol (IP) address(es) of the domain name;
pass the session ID for the client to a web server session manager of the DNS name server;
monitor a status of the web server;
apply session management logic to the session ID, the session management logic being configured to determine whether or not to forward the client device to the web server based on one or more of: a monitored capacity of the web server, and information about the client device obtainable from the session ID; and
if the logic determines the capacity is available in the web server for the client, causing the DNS name server to send to the client device a DNS reply containing the address of the web server configured to provide the client with access to the target resource; and
if the logic determines that capacity is not available in the web server for the client, cause the DNS name server to send to the client device a DNS reply containing an address of a waiting room web server configured to provide the client with access to a waiting room resource where the client device can wait until the DNS name server provides the client device with access to the tar et resource the waiting room web server to configure the client device to retry requesting access to the target resource;
wherein the waiting room web server is configured such that it can serve client access to the waiting room resource with a low per-client overhead compared to the web server configured to provide the client with access to the target resource.

15. A non-transitory computer readable medium, carrying instructions which when executed by one or more processors of a DNS name server, cause the DNS name server to be configured as recited in claim 1.

16. A non-transitory computer readable medium, carrying instructions which when executed by one or more processors of a client device, cause the client device to be configured as recited in claim 11.

17. A method of operating a Domain Name System (DNS) name server for managing access by client devices to a web server configured to provide access to a target resource to client devices over the Internet in a short term data communication session, the method comprising:
   in response to receipt from a client device of a DNS query including a domain name generated by the client device, the domain name comprising a domain name associated with the address of the web server and a prefix label corresponding to a session identifier (ID) for identifying the client:
      resolving the Internet Protocol (IP) address(es) of the domain name;
      passing the session ID for the client to a web server session manager of the DNS name server;
      monitoring a status of the web server;
      applying session management logic to the session ID, the session management logic being configured to determine whether or not to forward the client device to the web server based on one or more of: a monitored capacity of the web server, and information about the client device obtainable from the session ID; and
   if the logic determines that capacity is available in the web server for the client, causing the DNS name server to send to the client device a ON reply containing the address of the web server configured to provide the client with access to the target resource; and
   if the logic determines that capacity is not available in the web server for the client, cause the DNS name server to send to the client device a DNS reply containing an address of a waiting room web server configured to provide the client with access to a waiting room resource where the client device can wait until the DNS name server provides the client device with access to the target resource, the waiting room web server to configure the client device to retry requesting access to the target resource;
   wherein the waiting room web server is configured such that it can serve client access to the waiting room resource with a low per-client overhead compared to the web server configured to provide the client with access to the target resource.

\* \* \* \* \*

UNITED STATES PATENT AND TRADEMARK OFFICE
CERTIFICATE OF CORRECTION

PATENT NO. : 10,819,801 B2  Page 1 of 1
APPLICATION NO. : 16/073524
DATED : October 27, 2020
INVENTOR(S) : Andy Shaw et al.

It is certified that error appears in the above-identified patent and that said Letters Patent is hereby corrected as shown below:

In the Specification

Column 6, Line 64, delete "clientidentifiercompany.com" and insert
-- clientidentifier.company.com --.

In the Claims

Column 10, Line 10, Claim number 1, delete "ON" and insert -- DNS --.

Column 10, Line 42, Claim number 1, delete "waft" and insert -- wait --.

Column 10, Line 48, Claim number 1, delete "room resource with a low per-client overhead target" and insert -- room resource with a low per-client overhead compared to the web server configured to provide the client with access to the target --.

Column 11, Line 48, Claim number 11, delete "client air," and insert -- client, the --.

Column 12, Line 43, Claim number 14, delete "the capacity" and insert -- that capacity --.

Column 12, Line 44, Claim number 14, delete "causing" and insert -- cause --.

Column 12, Line 56, Claim number 14, delete "tar et resource" and insert -- target resource, --.

Column 14, Line 6, Claim number 17, delete "ON" and insert -- DNS --.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*